United States Patent
Sowul et al.

(10) Patent No.: US 7,220,200 B2
(45) Date of Patent: *May 22, 2007

(54) ELECTRICALLY VARIABLE TRANSMISSION ARRANGEMENT WITH SPACED-APART SIMPLE PLANETARY GEAR SETS

(75) Inventors: Henryk Sowul, Oxford, MI (US); Alan G. Holmes, Clarkston, MI (US); Michael R. Schmidt, Carmel, IN (US); Donald Klemen, Carmel, IN (US); James D. Hendrickson, Belleville, MI (US)

(73) Assignee: General Motors Corporation, Detroit, MI (US)

( * ) Notice: Subject to any disclaimer, the term of this patent is extended or adjusted under 35 U.S.C. 154(b) by 149 days.

This patent is subject to a terminal disclaimer.

(21) Appl. No.: 11/071,405

(22) Filed: Mar. 3, 2005

(65) Prior Publication Data

US 2006/0025263 A1  Feb. 2, 2006

Related U.S. Application Data

(60) Provisional application No. 60/591,995, filed on Jul. 29, 2004.

(51) Int. Cl.
*F16H 3/72* (2006.01)

(52) U.S. Cl. .......................... 475/5; 475/282; 475/283; 180/65.2; 192/48.5; 192/48.6

(58) Field of Classification Search .................. 475/5, 475/282, 283; 477/3, 4, 5; 701/22; 180/65.2, 180/65.3; 290/40 C; 192/48.5, 48.6
See application file for complete search history.

(56) References Cited

U.S. PATENT DOCUMENTS

| | | | | |
|---|---|---|---|---|
| 4,653,348 A | * | 3/1987 | Hiraiwa | 475/276 |
| 6,478,705 B1 | * | 11/2002 | Holmes et al. | 475/5 |
| 6,527,658 B2 | | 3/2003 | Holmes et al. | 475/5 |
| 2005/0227801 A1 | * | 10/2005 | Schmidt et al. | 475/5 |
| 2005/0227803 A1 | * | 10/2005 | Holmes | 475/204 |
| 2006/0019785 A1 | * | 1/2006 | Holmes et al. | 475/5 |
| 2006/0025264 A1 | * | 2/2006 | Sowul et al. | 475/5 |
| 2006/0025265 A1 | * | 2/2006 | Sowul et al. | 475/5 |
| 2006/0046886 A1 | * | 3/2006 | Holmes et al. | 475/5 |

FOREIGN PATENT DOCUMENTS

EP            1247679 A2  *  10/2002

* cited by examiner

*Primary Examiner*—David D. Le
(74) *Attorney, Agent, or Firm*—Christopher DeVries

(57) ABSTRACT

An electrically variable transmission is provided including an input member to receive power from an engine; an output member connected to a transfer gear; first and second motor/generators; and first and second simple planetary gear sets each having first, second and third members. The input member is continuously connected to the first member of the first gear set, and the output member is continuously connected to the first member of the second gear set. The first motor/generator is continuously connected to the second member of the first gear set. The second motor/generator is continuously connected with the third member of the first or second gear set. The transfer gear and first and second torque transfer devices are positioned between the first and second gear sets.

12 Claims, 5 Drawing Sheets

ELECTRICALLY VARIABLE TRANSMISSION ARRANGEMENT WITH SPACED-APART SIMPLE PLANETARY GEAR SETS

CROSS-REFERENCE TO RELATED APPLICATION

This application claims the benefit of U.S. Provisional Application No. 60/591,995, filed Jul. 29, 2004, which is hereby incorporated by reference in its entirety.

TECHNICAL FIELD

The present invention relates to an electrically variable transmission having two simple planetary gear sets, two motor/generators, a transfer gear between the planetary gear sets, and three, four or five clutches, providing input split and compound split ranges.

BACKGROUND OF THE INVENTION

Internal combustion engines, particularly those of the reciprocating piston type, currently propel most vehicles. Internal combustion engines are relatively efficient, compact, lightweight, and inexpensive mechanisms by which to convert fossil fuel into useful mechanical power, so they are very suitable for vehicle propulsion. A novel transmission system which can reduce emissions and fuel consumption when used with internal combustion engines may be of great benefit to the public.

The flexibility with which reciprocating piston internal combustion engines operate poses challenges. Typically, a vehicle is propelled by such an engine, which is started from a cold state by a small electric motor and relatively small electric storage batteries, then quickly placed under the load of effecting propulsion and operating accessory equipment. Such an engine is also operated through a wide range of speeds and a wide range of loads and typically at a fifth of its maximum power. These wide ranges of engine operation require that clean, efficient combustion be maintained through extremes in operating conditions—an elusive goal.

A vehicle transmission can deliver mechanical power from an engine to the remainder of a drive system, typically fixed gearing, axles, and wheels. A transmission allows some freedom in engine operation, usually through alternate selection of five or six different drive ratios, a neutral selection that allows the engine to operate accessories with the vehicle stationary, and clutches or torque converters that allow smooth transitions between driving ratios to start the vehicle from rest and accelerate to the desired highway speed with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

An electric generator can transform mechanical power from the engine into electrical power, and an electric motor can transform that electric power back into mechanical power at different torques and speeds for the remainder of the vehicle drive system. This arrangement allows a continuous variation in the ratio of torque and speed between engine and the remainder of the drive system, within the limits of the electric machinery. An electric storage battery used as a source of power for propulsion may be added to this arrangement, forming a series hybrid electric drive system.

The series hybrid system allows the engine to operate relatively independently of the torque, speed, and power to propel a vehicle, so as to be controlled for improved emissions and efficiency. This system also allows the electric machine attached to the engine to function as a motor to start the engine and allows the electric machine attached to the remainder of the drive train to act as a generator, recovering energy into the battery by regenerative braking. A series electric drive suffers from the weight of the electric machinery necessary to transform all engine power from mechanical to electrical and from electrical to mechanical, and from the useful power lost in this double conversion.

A power split transmission can use what is commonly understood to be a "differential gearing" to achieve a continuously variable torque and speed ratio between input and output without sending all power through the variable elements. An electrically variable transmission can use differential gearing to send a fraction of its transmitted power through a pair of electric motor/generators and the remainder of its power through another, parallel path that is all mechanical and direct, of fixed ratio, or alternatively selectable. One form of differential gearing, as is well known to those skilled in this art, may constitute a planetary gear set. In fact, planetary gearing is usually the preferred embodiment employed in differentially geared inventions, with the advantage of compactness and different torque and speed ratios among all members of the planetary gearing set. However, it is possible to construct this invention without planetary gears, as by using bevel differential gears or other differential gears.

For example, a set of bevel differential gears found in a typical automobile axle consists of three or four bevel pinions on a carrier and a meshing bevel gear for each axle. To replace the first set of planetary gearing in the first embodiment of the invention, the carrier of a first set of bevel differential gears would be connected to the input, one bevel gear that would normally be connected to an axle would instead be connected to the first motor, and the other such bevel gear would be connected to the central shaft. Bevel differential gears could likewise replace the second set of planetary gearing, and so the invention could be embodied without any planetary gears.

A hybrid electrically variable transmission system for a vehicle also includes an electric storage battery, which allows the mechanical output power to vary from the mechanical input power, engine starting with the transmission system and regenerative vehicle braking.

An electrically variable transmission in a vehicle can simply transmit mechanical power. To do so, the electric power produced by one motor/generator balances the electrical losses and the electric power consumed by the other motor/generator. A hybrid electrically variable transmission system in a vehicle includes an electrical storage battery, so the electric power generated by one motor/generator can be greater than or less than the electric power consumed by the other. Electric power from the battery can sometimes allow both motor/generators to act as motors, especially to assist the engine with vehicle acceleration. Both motors can sometimes act as generators to recharge the battery, especially in regenerative vehicle braking.

One of the most successful substitutes for the series hybrid transmission is the variable, two-mode, input-split, parallel, hybrid electric transmission. Such a transmission utilizes an input means to receive power from the vehicle engine and a power output means to deliver power to drive the vehicle. First and second motor/generators are connected to energy storage devices, such as batteries, so that the energy storage devices can accept power from, and supply power to, the first and second motor/generators. A control unit regulates power flow among the energy storage devices and the motor/generators as well as between the first and second motor/generators.

Operation in a first or second mode may be selectively achieved by using clutches in the nature of torque transfer devices. In one mode the output speed of the transmission is proportional to the speed of one motor/generator, and in the second mode the output speed of the transmission is generally proportional to the speed of the other motor/generator.

In some embodiments of the variable, two-mode, input-split, parallel, hybrid electric transmission a second planetary gear set is employed. In addition, some embodiments may utilize three torque transfer devices—two to select the operational mode desired of the transmission and the third selectively to disconnect the transmission from the engine. In other embodiments, all three torque transfers may be utilized to select the desired operational mode of the transmission.

As those skilled in the art will appreciate, a transmission system using a power split arrangement will receive power from two sources. Utilization of one or more planetary gear sets permits two or more gear trains, or modes, by which to deliver power from the input member of the transmission to the output member thereof.

Accordingly, there is a need in the art for a large horsepower transmission system which provides maximum power with little additional power provided by the electric storage device. It is also desirable to enhance overall efficiency at high output speeds. These objectives can be achieved by a two-mode, compound-split, electromechanical transmission that provides the desired high efficiency sought for continuous, constant-speed operation as well as high-average power applications.

U.S. Pat. No. 6,527,658, issued Mar. 4, 2003 to Holmes et al, and commonly assigned with the present application, discloses an electrically variable transmission utilizing two planetary gear sets, two motor/generators and two clutches to provide input split, compound split, neutral and reverse modes of operation. Both planetary gear sets may be simple, or one may be individually compounded. An electrical control member regulates power flow among an energy storage device and the two motor/generators. This transmission provides two ranges or modes of electrically variable transmission (EVT) operation, providing input power split or compound power split modes of operation, and one fixed ratio is available. A "fixed ratio" is an operating condition in which no power flows through the motor/generators to minimize losses.

U.S. Provisional Patent Application Ser. No. 60/590,427, to Holmes et al, filed Jul. 22, 2004, entitled "Electrically Variable Transmission with Selective Fixed Ratio Operation", commonly assigned with the present application, and hereby incorporated by reference, discloses an electrically variable transmission having two planetary gear sets, two motor/generators, and three, four or fives torque transfer devices to provide input split, compound split, output split, neutral and electric reverse modes of operation.

SUMMARY OF THE INVENTION

The present invention provides various stick diagram configurations which correspond with the power flows described in the above-referenced U.S. Pat. No. 6,527,658 and the above-referenced U.S. Provisional Patent Application Ser. No. 60/590,427 to Holmes et al., filed Jul. 22, 2004 and entitled "Electrically Variable Transmission with Selective Fixed Ratio Operation."

The stick diagrams are not merely power flows but rather provide packaging and location information for the planetary gear sets, clutches, motors, shafts, bearings, etc. A stick diagram is a precursor to an actual cross section in that it identifies where each component will be positioned, and in what manner components will be supported and interconnected. The stick diagrams also show how the various clutches are positioned and supported between or adjacent planetary gear sets within hubs or piston housings.

More specifically, the invention provides an electrically variable transmission including an input member to receive power from an engine; an output member connected to a transfer gear; first and second motor/generators; and first and second simple planetary gear sets each having first, second and third members. The input member is continuously connected to the first member of the first gear set, and the output member is continuously connected to the first member of the second gear set. The first motor/generator is continuously connected to the second member of the first gear set. The second motor/generator is continuously connected with the third member of the first or second gear set. A first torque transfer device selectively grounds the second member of the second gear set. A second torque transfer device selectively connects the second member of the second gear set to the first electric motor/generator. The third member of the first gear set is selectively or continuously connected with the third member of the second gear set. The transfer gear and the first and second torque transfer devices are positioned between the first and second gear sets.

The first, second and third members of the first gear set are embodied as a carrier, a sun gear, and a ring gear, respectively, and the first, second and third members of the second gear set are embodied as a carrier, ring gear and sun gear, respectively.

An optional third torque transfer device selectively grounds the second or third member of the first gear set, or selectively grounds the third member of the second gear set, wherein the third torque transfer device is not positioned between the first and second gear sets.

An optional fourth torque transfer device selectively connects the third member of said first planetary gear set with said third member of said second planetary gear set.

In one embodiment, the third member of the first planetary gear set is selectively connected with the third member of the second planetary gear set through a third torque transfer device configured as a dog clutch; a fourth torque transfer device selectively connects the first and third members of the first planetary gear set with each other; and a fifth torque transfer device operative as a one-way clutch selectively grounds the third member of the first planetary gear set.

Further, a rigid rotor support member and rotor support bearing for the first motor/generator are positioned between the first and second planetary gear sets.

The above features and advantages, and other features and advantages of the present invention are readily apparent from the following detailed description of the preferred embodiments for carrying out the invention when taken in connection with the accompanying drawings.

DESCRIPTION OF THE PREFERRED EMBODIMENTS

Figure 1:
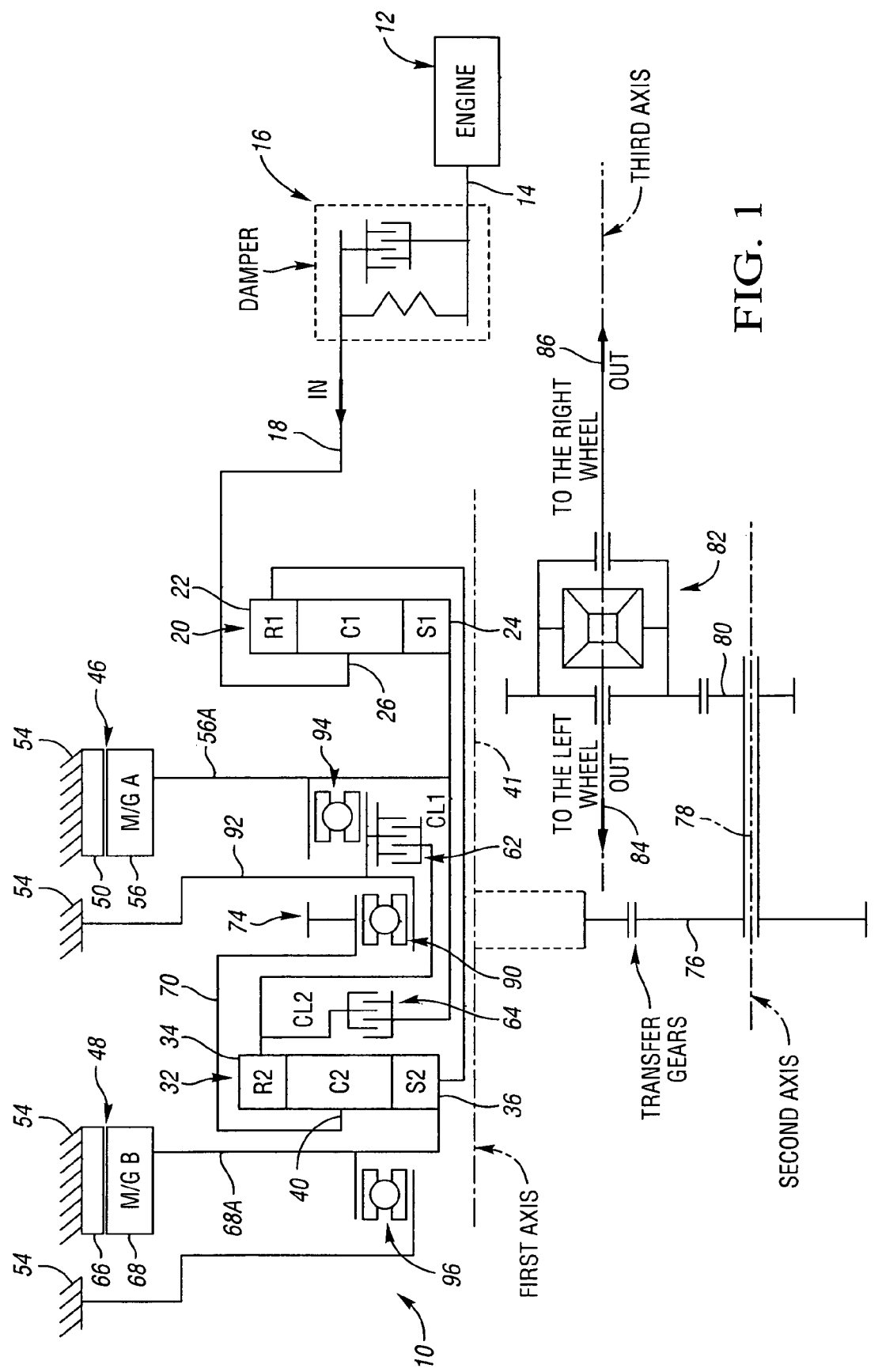
FIG. 1 shows a schematic stick diagram of an electrically variable transmission in accordance with the present invention.

Referring to FIG. 1, one preferred embodiment of the improved electrically variable transmission is designated generally by the numeral 10. The transmission 10 is designed to receive at least a portion of its driving power from an engine 12. As shown, the engine 12 has an output shaft 14 that may also serve as the forward input member of a transient torque damper 16. Transient torque dampers are well known in the art, but irrespective of the particular transient torque damper 16 employed, the output member thereof serves as the input member 18 of the transmission 10.

In the embodiment depicted, the engine 12 may be a fossil fuel engine, such as a diesel engine which is readily adapted to provide its available power output typically delivered at a constant number of revolutions per minute (RPM).

Irrespective of the means by which the engine 12 is connected to the transmission input member 18, the transmission input member 18 is operatively connected to a planetary gear set 20 in the transmission 10. The transmission 10 utilizes two gear sets, preferably in the nature of simple planetary gear sets. The first planetary gear set 20 employs an outer ring gear 22 which circumscribes an inner sun gear 24. A carrier 26 rotatably supports a plurality of planet gears such that each planet gear simultaneously and meshingly engages both the outer ring gear 22 and the inner sun gear 24. The input member 18 is secured to the carrier 26 of the first planetary gear set 20.

The second planetary gear set 32 also has an outer ring gear 34 which circumscribes an inner sun gear 36. A plurality of planet gears are rotatably supported on a carrier 40 such that the planet gears engage both the outer ring gear 34 and the inner sun gear 36.

Whereas both planetary gear sets 20 and 32 are simple planetary gear sets, the first and second planetary gear sets 20 and 32 are compounded in that the sun gear 36 of the planetary gear set 32 is continuously connected with the ring gear 22 of the planetary gear set 20.

This embodiment 10 also incorporates first and second motor/generators 46 and 48, respectively. The stator 50 of the first motor/generator 46 is secured to the transmission housing 54. The rotor 56 of the first motor/generator 46 is secured to the sun gear 24 of the first planetary gear set 20 via rigid member 56A. The stator 66 of the second motor/generator 48 is also secured to the transmission housing 54. The rotor 68 of the second motor/generator 48 is secured to the sun gear 36 via rigid member 68A.

The ring gear 34 of the second planetary gear set 32 is selectively grounded to the housing 54 by a first clutch means in the nature of a torque transfer device 62 (CL1). That is, the grounded ring gear 34 is selectively secured against rotation by an operative connection to the non-rotatable housing 54. The ring gear 34 of the second planetary gear set 32 is also selectively connected to the sun gear 24 by a second clutch means in the nature of a torque transfer device 64 (CL2). The first and second torque transfer devices 62 and 64 are employed to assist in the selection of the operational modes of the hybrid transmission 10.

The two planetary gear sets 20 and 32 are coaxially oriented about the first axis 41.

The output drive member 70 of the transmission 10 is secured to the carrier 40 of the second planetary gear set 32. As depicted in FIG. 1, the output drive member 70 is connected to a transfer gear 74, which transfers power to the secondary gear 76. The power is then transferred about the second axis 78 from the gear 80 to the differential 82, and finally to the left and right wheels 84, 86.

As shown, in this configuration, the transfer gear 74 is positioned between the two planetary gear sets 20, 32, and between the motors 46, 48. The transfer gear 74 is also between the two clutches 62, 64. The transfer gear 74 is supported on a bearing 90 which is rigidly supported on a hub 92 with respect to the transmission housing 54. The motor/generators 46, 48 are supported on bearings 94, 96, respectively, such that one side of each motor/generator is supported.

Operation of the transmission 10 is described in the above-referenced U.S. Pat. No. 6,527,658.

As illustrated in FIG. 1 of the present application, the transfer gear 74, bearings 90, 94, clutches 62, 64, and motor/generator support member 56A are all packaged between the two simple planetary gear sets 20, 32.

As referred to in the appended claims, the "first" planetary gear set is the gear set 20, and the "second" planetary gear set is the gear set 32. The "first" motor/generator is the motor/generator 46, and the "second" motor/generator is the motor/generator 48. The claimed first, second and third members of the first planetary gear set 20 are the carrier 26, sun gear 24, and ring gear 22, respectively. The first, second and third members of the second planetary gear set 32 are the carrier 40, ring gear 34, and sun gear 36, respectively.

Figure 2:
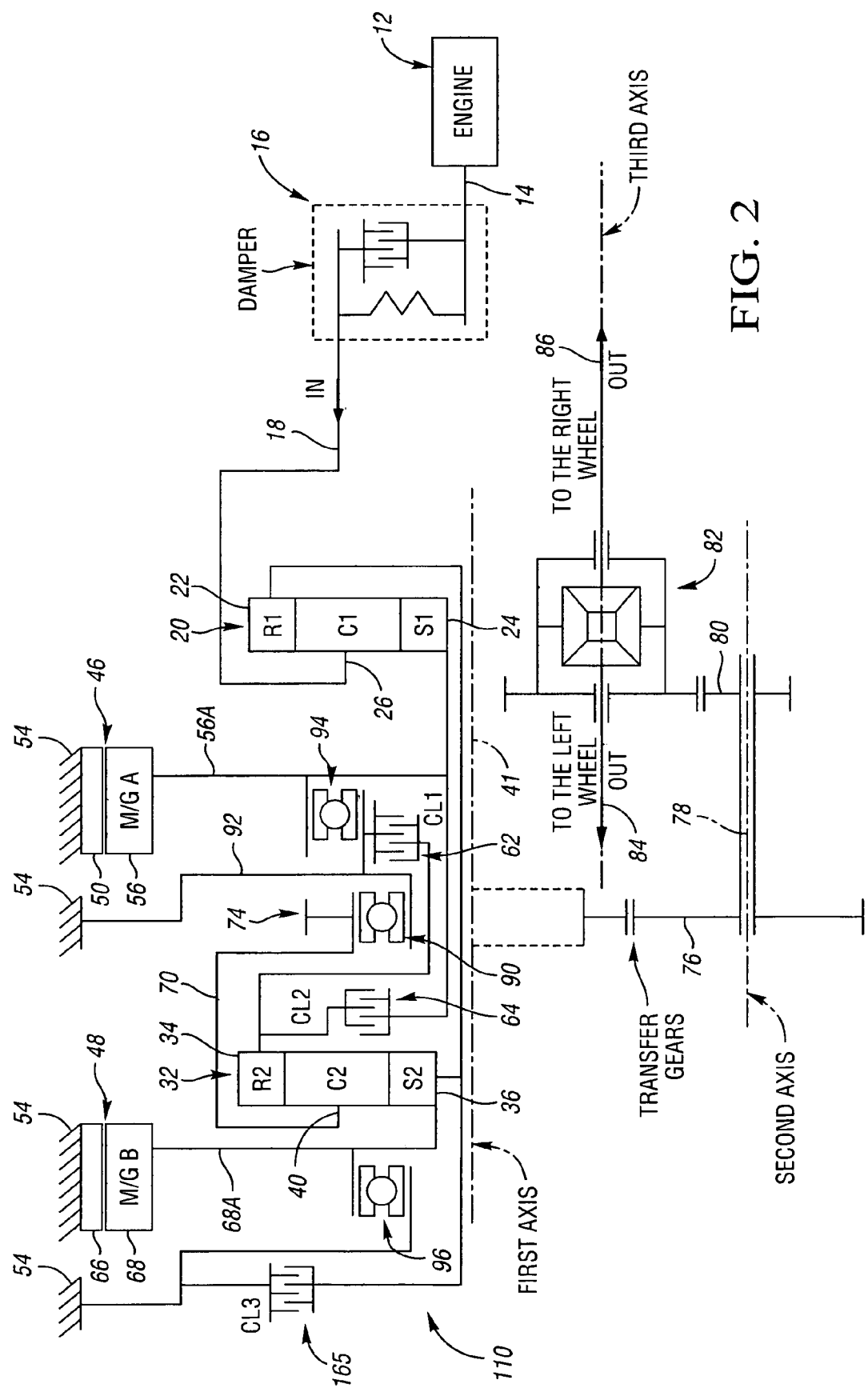
FIG. 2 shows a schematic stick diagram of an electrically variable transmission in accordance with a first alternative embodiment of the present invention.

Turning to FIG. 2, a transmission 110 is shown in accordance with a first alternative embodiment of the invention which is nearly identical to that shown in FIG. 1. Like reference numerals are used in FIG. 2 to describe like components from FIG. 1.

The only difference between the transmission 110 of FIG. 2 and the transmission 10 of FIG. 1 is that, in FIG. 2, the torque transfer device 165 (CL3) has been added to selectively connect the sun gear 36 of the second planetary gear set 32 with the transmission housing 54. The torque transfer device 165 (CL3) is a friction clutch which is operative as an overdrive brake to provide a third fixed ratio for the transmission 110. The remaining components are identical to those described above with respect to FIG. 1. This description will not be repeated here.

Accordingly, as illustrated in FIG. 2, the transfer gear 74, bearings 90, 94, clutches 62, 64, and motor/generator support member 56A are all packaged between the two simple planetary gear sets 20 and 32.

Figure 3:
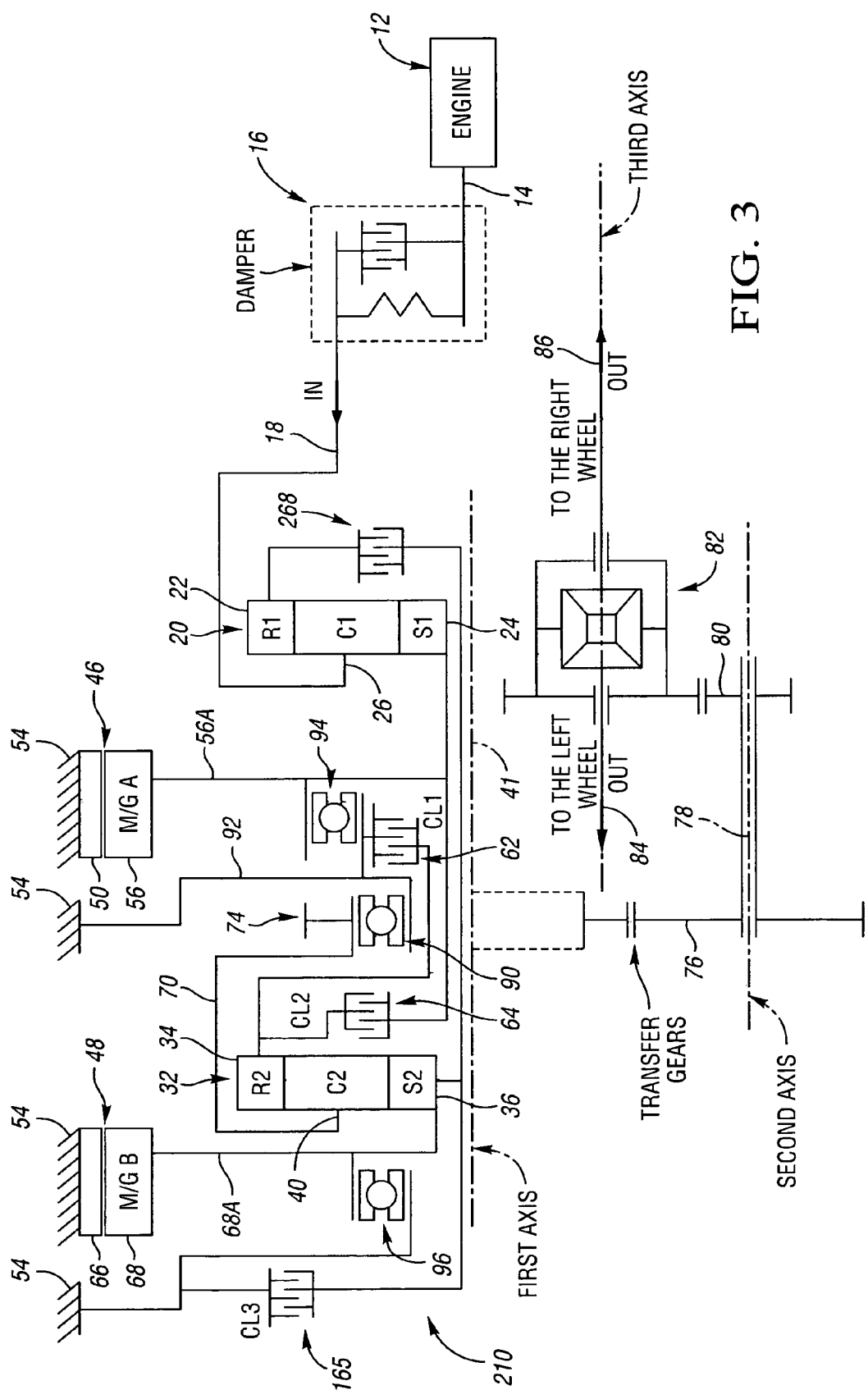
FIG. 3 shows a schematic stick diagram of an electrically variable transmission in accordance with a second alternative embodiment of the present invention.

Turning to FIG. 3, a transmission 210 is shown in accordance with a second alternative embodiment of the invention. In FIG. 3, like reference numerals refer to like components from FIGS. 1 and 2. This transmission configuration is identical to the transmission 110 shown in FIG. 2 except for the addition of the friction clutch 268. The clutch 268 selectively connects the sun gear 36 with the ring gear 22. It is operative to selectively decouple the engine 12 and first planetary gear set 20 from the second planetary gear set 32. Accordingly, the first motor/generator 46 can be used to start the engine, and the engine 12 may actuate the motor/generator 46, which assists the motor/generator 48 in driving the vehicle in reverse. Also, the motor/generator 48 can drive the vehicle independently. Operation of a similar clutch and corresponding description may be found in U.S. patent application Ser. No. 10/946,760 filed Sep. 22, 2004 to Sowul et al., entitled "Electrically Variable Transmission with Decoupled Engine Charging in Reverse." This application is hereby incorporated by reference in its entirety.

The remaining structure shown in FIG. 3 is identical to that of FIG. 2, and the description will not be repeated herein.

Figure 4:
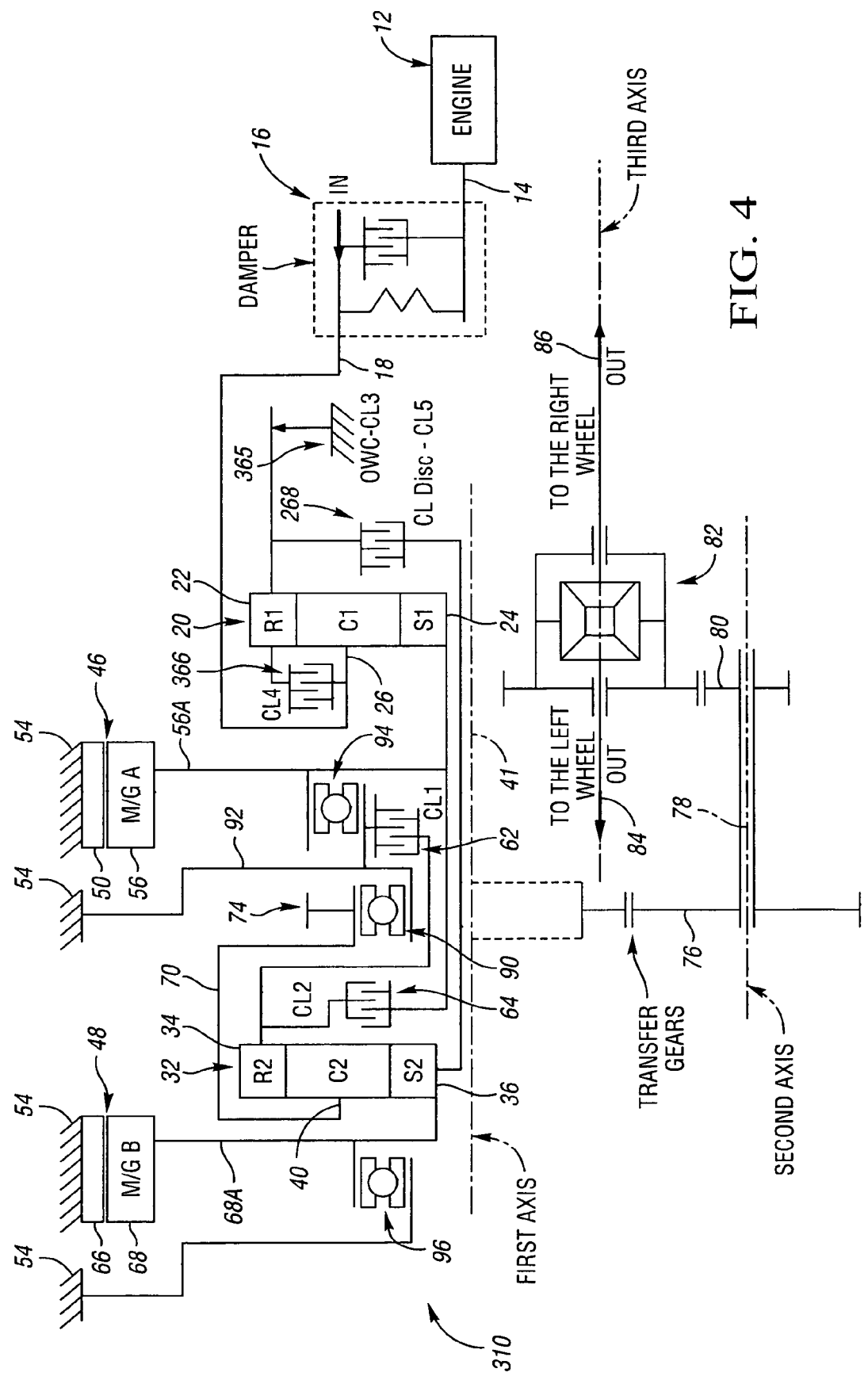
FIG. 4 shows a schematic stick diagram of an electrically variable transmission in accordance with a third alternative embodiment of the present invention.

Turning to FIG. 4, the transmission 310 shown in FIG. 4 in accordance with a third alternative embodiment of the invention is substantially identical to the transmission 210 shown in FIG. 3, except that the torque transfer device 165 of FIG. 3 has been changed to a one-way clutch 365 at the location shown in FIG. 4, and the lock up clutch 366 has been added in FIG. 4. One-way clutch 365 improves packaging because the one-way clutch is smaller than a friction clutch. The torque transfer device 366 is a direct drive 1:1 clutch which locks out the first planetary gear set 20 into a direct drive ratio. The remaining components of FIG. 4 are identical to those of the transmission of FIG. 3, and like reference numerals are used to refer to like components from FIGS. 1–3.

Figure 5:
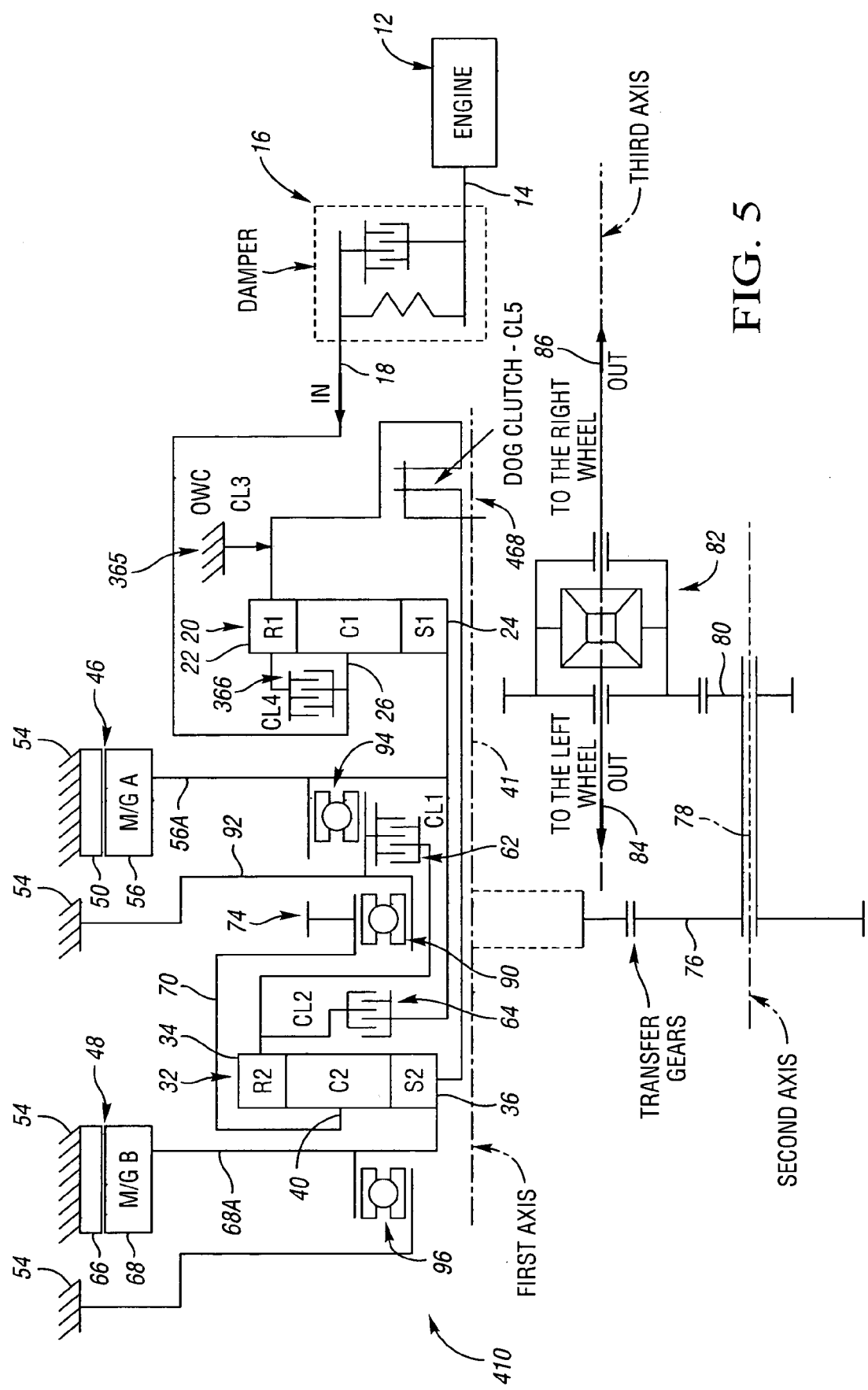
FIG. 5 shows a schematic stick diagram of an electrically variable transmission in accordance with a fourth alternative embodiment of the present invention.

Turning to FIG. 5, the transmission 410 shown in FIG. 5 in accordance with a fourth alternative embodiment of the invention is identical to the transmission 310 shown in FIG. 4 except that the clutch 268 of FIG. 4 has been reconfigured as a dog clutch 468 in FIG. 5. The dog clutch 468 improves packaging. Like reference numerals in FIG. 5 illustrate like components from FIGS. 1–4.

While the best modes for carrying out the invention have been described in detail, those familiar with the art to which this invention relates will recognize various alternative designs and embodiments for practicing the invention within the spirit and scope of the invention defined herein.

The invention claimed is:

1. An electrically variable transmission comprising:
an input member to receive power from an engine;
an output member connected to a transfer gear;
first and second motor/generators;
first and second simple planetary gear sets each having first, second and third members;
said input member being continuously connected to said first member of said first gear set, and said output member being continuously connected to said first member of said second gear set;
said first motor/generator being continuously connected to said second member of said first gear set;
said second motor/generator being continuously connected with said third member of said first or second gear set;
a first torque transfer device selectively grounding said second member of said second gear set;
a second torque transfer device selectively connecting said second member of said second gear set to said first electric motor/generator;
a third torque transfer device selectively grounding said third member of said first gear set, or selectively grounding said third member of said second gear set, said third torque transfer device not being positioned between said first and second gear sets;
wherein said third member of said first gear set is selectively or continuously connected with said third member of said second gear set; and
wherein said transfer gear and said first and second torque transfer devices are positioned between said first and second gear sets.

2. The electrically variable transmission of claim 1, further comprising a rigid rotor support member and rotor support bearing for said first motor/generator positioned between said first and second planetary gear sets.

3. The electrically variable transmission of claim 1, wherein said first, second and third members of said first gear set comprise a carrier, a sun gear, and a ring gear, respectively, and said first, second and third members of said second gear set comprise a carrier, ring gear and sun gear respectively.

4. The electrically variable transmission of claim 1, further comprising a fourth torque transfer device selectively connecting said third member of said first planetary gear set with said third member of said second planetary gear set.

5. The electrically variable transmission of claim 1, wherein said third member of said first planetary gear set is selectively connected with said third member of said second planetary gear set through a fourth torque transfer device, and further comprising a fifth torque transfer device selectively connecting said first and third members of said first planetary gear set wit each other.

6. The electrically variable transmission of claim 1, wherein said third member of said first planetary gear set is selectively connected with said third member of said second planetary gear set through a fifth torque transfer device configured as a dog clutch, and further comprising a fourth torque transfer device selectively connecting said first and third members of said first planetary gear set with each other, and said third torque transfer device operative as a one-way clutch selectively grounding said third member of said first planetary gear set.

7. An electrically variable transmission comprising
an input member to receive power from an engine;
an output member connected to a transfer gear;
first and second motor/generators;
first and second simple planetary gear sets each having first, second and third members;
said input member being continuously connected to said first member of said first gear set, and said output member being continuously connected to said first member of said second gear set;
said first motor/generator being continuously connected to said second member of said first gear set;
said second motor/generator being continuously connected with said third member of said second gear set;
a first torque transfer device selectively grounding said second member of said second gear set;
a second torque transfer device selectively connecting said second member of said second gear set to said first electric motor/generator; and
a third torque transfer device selectively connecting said third member of said first gear set with said third member of said second gear set, wherein said third member of said second gear set is selectively grounded by a fourth torque transfer device;

wherein said transfer gear and said first and second torque transfer devices are positioned between said first and second gear sets.

8. The electrically vadable transmission of claim 7, wherein said first, second and third members of said first gear set comprise a carrier, sun gear, and ring gear, respectively, and said first, second and third members of said second gear set comprise a carrier, ring gear and sun gear respectively.

9. The electrically variable transmission of claim 8, wherein said third and fourth torque transfer devices are not positioned between said first and second gear sets.

10. The electrically variable transmission of claim 8, further comprising a rigid rotor support member and rotor support bearing for said first motor/generator positioned between said first and second planetary gear sets.

11. An electrically variable transmission comprising:
an input member to receive power from an engine;
an output member connected to a transfer gear;
first and second motor/generators;
first and second simple differential gear sets each having a sun gear member and a ring gear member, each of which meshingly engage a plurality of gear members rotatably mounted on a carrier;
said input member being operatively connected to said carrier of said first differential gear set;
said output member being operatively connected to said carrier in said second differential gear set;
one of said first and said second motor/generators operatively connected to said sun gear member in said first differential gear set;
the other of said first and said second motor/generators being in continuous, operative connection with said sun gear member of said second differential gear set and with said ring gear member of said first differential gear set;
a first torque transfer device selectively grounding said ring gear member of said second differential gear set;
a second torque transfer device selectively connecting said ring gear member of said second differential gear set to said sun gear member of said first differential gear set; and
a third torque transfer device selectively grounding said sun gear member of said second gear set, said third torque transfer device not being positioned between said first and second gear sets;
wherein said transfer gear and said first and second torque transfer devices are positioned between said first and second differential gear sets.

12. The electrically variable transmission of claim 11, further comprising a rigid rotor support member and rotor support bearing for said first motor/generator positioned between said first and second gear sets.

* * * * *